Feb. 17, 1925.
J. A. DUCA
ADJUSTABLE DIE
Filed Dec. 5, 1923     2 Sheets-Sheet 1
1,526,699
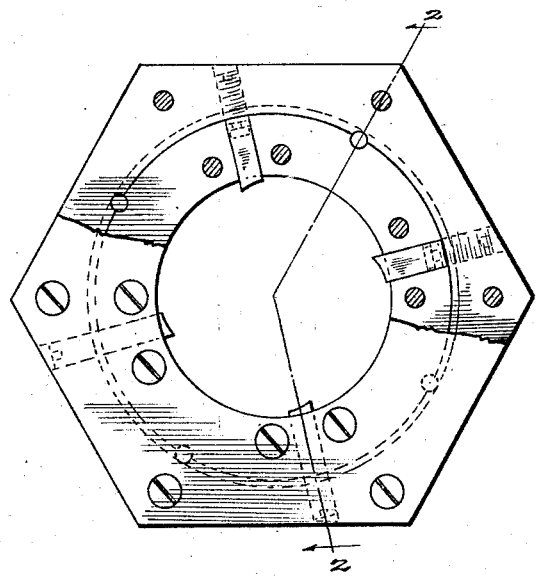
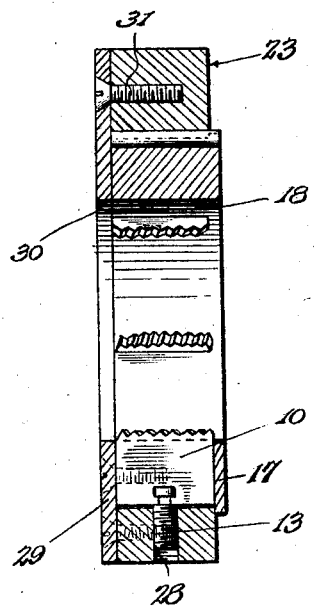
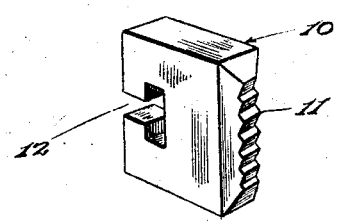
Inventor
J. A. Duca.
By
Lacy & Lacy, Attorneys

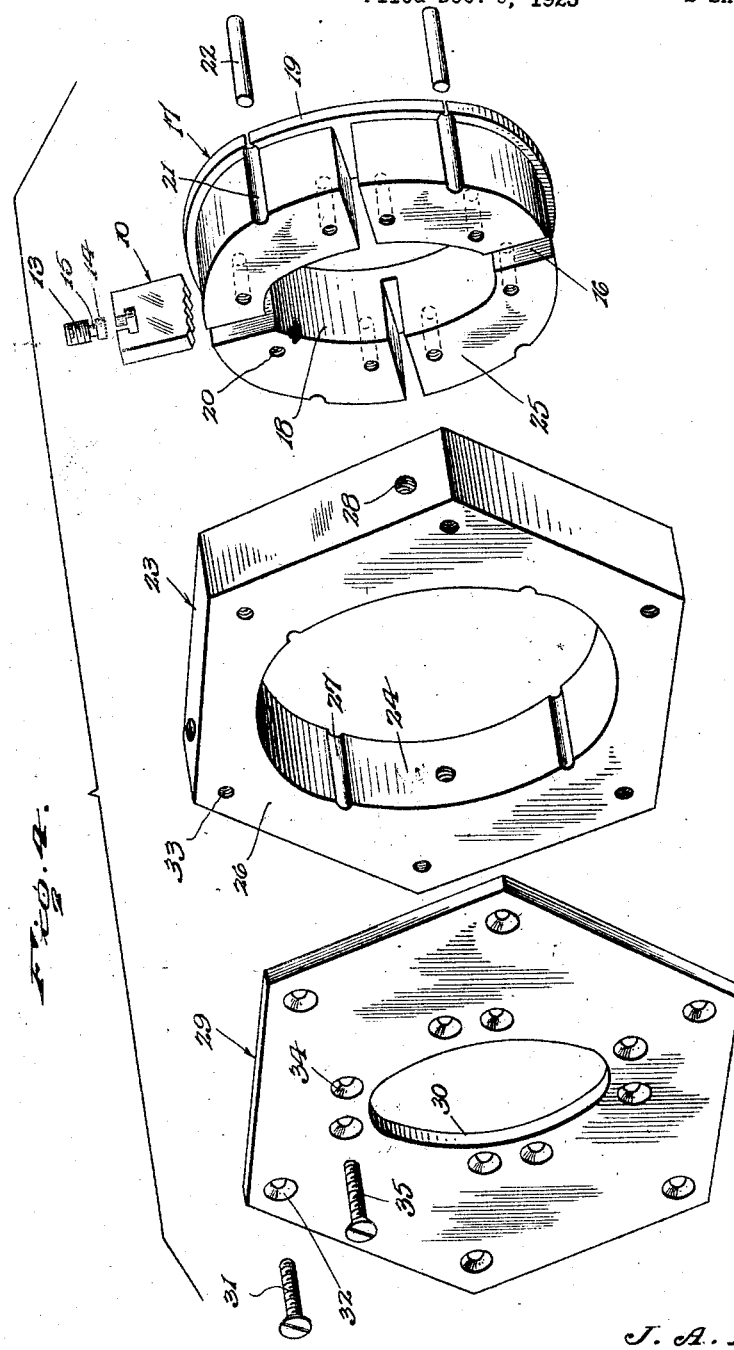

Patented Feb. 17, 1925.

1,526,699

UNITED STATES PATENT OFFICE.

JOAN A. DUCA, OF SHAWNEE, OKLAHOMA, ASSIGNOR OF ONE-HALF TO HENRY J. MACKEY, OF OKLAHOMA CITY, OKLAHOMA.

ADJUSTABLE DIE.

Application filed December 5, 1923. Serial No. 678,713.

*To all whom it may concern:*

Be it known that I, JOAN A. DUCA, a citizen of the United States, residing at Shawnee, in the county of Pottawatomie and State of Oklahoma, have invented certain new and useful Improvements in Adjustable Dies, of which the following is a specification.

The present invention relates to a die for cutting screw threads and has as its main object the provision of a die in which the cutters or bits may be very finely adjusted to different depths of thread and diameter of bolts.

In the accompanying drawings, one embodiment of the invention is illustrated, and Figure 1 is a plan view of the die assembled, some parts being removed;

Figure 2 is a section along line 2—2 of Figure 1;

Figure 3 is a perspective view of a bit; and

Figure 4 is a perspective view of the different parts of which the device is made up and separated from each other.

In the drawings, reference numeral 10 represents one of the thread chasing bits or cutters which is rectangular in shape and provided with cutting teeth 11 at one end thereof. On the opposite end is provided a T-slot 12. In this T-slot a set screw 13 is adapted to engage with its head 14 in the wide part of the same, while the neck 15 engages in the narrow passage opening in the rear face of the bit.

The bits, of which four have been shown in the drawing, are housed in radially directed slots 16 in a die carrier 17. These radial slots are preferably arranged at right angles to each other but it is evident that for larger bolts a greater number of slots for additional cutters or bits may be provided at different angles and, on the other hand, for smaller bolts the number of slots and bits may be reduced. The die carrier 17 has a central bore 18 of greater diameter than the largest bolt intended to be threaded by the die. The carrier which is cylindrical in shape has an outwardly projecting flange 19 at one end thereof while the other end is provided with a smooth flat surface. The thickness of the walls of the carrier is preferably slightly less than the length of the bits or cutters 10 so that the cutting teeth 11 will always project into the bore of the carrier. A plurality of threaded apertures 20 running parallel to the axis of the carrier are provided in its annular wall and the outer cylindrical surface of the carrier has semi-cylindrical grooves 21 for receiving dowels 22.

Reference numeral 23 represents the head or nut of the die which is preferably hexagonal and provided with a bore 24 to receive the body of the carrier 17. The thickness of the nut 23 corresponds to the height or thickness of the carrier measured from the flange 19 to its forward flat face 25. When the carrier is assembled in the nut the front surface 25 of the carrier will accordingly become flush with the front surface 26 of the nut 23. Around the bore 24 is to be found a number of semi-cylindrical recesses or grooves 27 corresponding to the grooves 21 in the carrier. When the latter is assembled in the nut the half round recesses or grooves 21 and 27 will register with each other to permit the insertion of the dowels 22. At 28 are shown threaded apertures running in radial direction of the nut 23 and adapted to register with the slots 16 of the carrier when the latter is assembled with the nut. These threaded apertures 28 are intended to hold the set screws 13 and to permit radial displacement of the bits 10 when said set screws 13 are turned to adjust the position of the bits in the die.

Reference numeral 29 represents the cover plate or cap of the die which is of the same contour as the nut 23 and has a central bore 30 of the same diameter as the bore 18 of the carrier. The cap 29 is secured to the nut 23 by means of securing screws 31 for which tapering screw holes 32 are provided in the cap registering with threaded screw holes 33 in the nut 23. Other tapering apertures 34 are also provided in the cap 29 for screws 35 which are adapted to engage in the threaded apertures 20 in the carrier.

In order to assemble the die, the set screws 13 are first inserted in the openings 28 provided therefor in the nut 23 and permitted to project through the bore 24 sufficiently to assemble one of the bits 10 on each screw. The set screws may thereupon be retracted sufficiently to temporarily hold the bits tight against the surface of the bore 24. The carrier 17 is thereupon inserted in the nut 23 and secured therein by the dowels 22, these dowels locking the carrier and nut together in circumferential direction so that no turning of the nut with relation to the carrier can take place. The carrier is inserted as far as it will go into the nut until the flange 19 of the carrier abuts against the forward face of the nut and care must be taken that each slot 16 engages a corresponding bit 10.

The cap 29 is now laid on the front face 26 of the nut 23 covering the same as well as the front face 25 of the carrier and the cap is secured to both by means of the screws 31 and 35. The bits 10 are now supported by the sides of the slots 16 and the flange 19 at one end and the cap 29 at the other end so that no movement of the bits can take place in any direction other than radial which is governed by the set screws 13. The bits 10 are lastly adjusted by means of these screws to the correct diameter of the bolt to be threaded.

The die is manufactured from the best kind of material and the nut and carrier preferably made of machine steel forgings while the bits and dowel pins are tool steel.

The die forms a very rigid construction so that there is no rattling or shaking of the different parts from which it is made up and on account of the radial displacement obtainable through the set screws of the bits a very fine adjustment may be obtained for bolts of different diameters.

It is evident that each die may be provided with several sets of bits for different type and different pitch of thread.

Having thus described the invention, what is claimed as new is:

An adjustable die comprising a plurality of bits, a carrier for the bits permitting a substantially radial displacement thereof, a housing for the carrier, dowels adapted to lock the carrier in the housing, set screws having T-heads engaging in corresponding slots in said bits, said housing being provided with threaded apertures for the set screws, and a cap secured to one end of the carrier and the housing respectively and contacting with said bits in order to guide the same in the carrier.

In testimony whereof I affix my signature.

JOAN A. DUCA. [L. S.]